Patented Apr. 19, 1938

2,114,525

UNITED STATES PATENT OFFICE 2,114,525

LUBRICANT

Egon Eichwald, Amsterdam, Netherlands, assignor to Shell Development Company, San Francisco, Calif., a corporation of Delaware No Drawing. Application August 24, 1934, Serial No. 741,300. In the Netherlands August 29, 1933

2 Claims. (Cl. 87—9)

This invention pertains to the composition of lubricating oils or greases.

It is well known that the design and operating conditions of modern machinery place severe demands on high grade lubricating oils. Thus, the lubricant must possess a sufficient fluidity to have access to tightly fitting parts at low temperatures, when, for example, a motor has just been started, and, on the other hand, it must also have a sufficient viscosity to provide an effectively protective film of oil even at relatively high temperatures when, for example, a motor is somewhat overheated after a long run. The characteristics of a lubricant satisfying these requirements are expressed, inter alia, by a flat temperature-viscosity curve i. e. a high viscosity index.

It is the object of this invention to provide a process by which lubricating oils possessing to a high degree these desired properties can be manufactured in a simple and inexpensive way.

Briefly stated, this invention consists in intensively polymerizing fatty oils by contacting them at a suitable temperature with an active catalyst and subsequently using the polymerized material as a lubricant or mixing it with hydrocarbon oils or greases to improve their lubricating properties.

The polymers obtained from fatty oils by means of catalysts are usually far superior for use as lubricants or lubricant components than the polymers produced by simply heating the fatty oils, either in the presence or absence of air. The desirable properties, i. e. a relatively high viscosity and solubility of the polymers in mineral oils, are materially enhanced by treating fatty oils by means of polymerizing catalysts.

As a source of fatty oils for the polymerization process, it is preferable to use animal and/or vegetable oils, such as whale oil, lard oil, castor oil, rape seed oil, soya bean oil, etc. In some cases, these oils may be purified by conventional methods before polymerization.

As catalysts, any of the compounds known as active accelerators in the polymerization of unsaturated hydrocarbons, such, for example, as the halogenides of the elements of the second and third groups of the periodic system may be used. Although the activity of these agents varies within relatively wide limits, especially good results have been obtained with the fluorides of beryllium, aluminium and boron. With some of these agents such, for example, as boron fluoride, the polymerization can be effected at relatively low temperatures such as 100° C. and even below, although higher temperatures such as 180°–200° C. are ordinarily used. It may be noted that although it has already been proposed to use halogenated fats, esters, glycerides, etc. in the manufacturing of lubricating oils, the catalysts enumerated above are used in this process under such treating conditions that they serve only as polymerizing and not as halogenating agents, so that halogenation products may be obtained in this process only in negligible quantities, as impurities.

The invention may be further illustrated by the following example, without however being limited to any specific step or substance used.

A purified rape seed oil was heated for 33 hours at 100° C. with 1% by weight of boron fluoride. The product obtained was dissolved in an equal volume of benzol and washed twice with an equal volume of 50% alcohol, the alcohol layer, i. e. washings, being discarded each time. The clear, yellow-coloured polymerization product, obtained after the evaporation of the benzol from the upper layer, when added in a quantity of 6% by weight to a mineral oil having a viscosity of 15.01° Engler at 37° C. and a viscosity index of 4.9, raised the viscosity of the mixture to 25.47° Engler at 37° C. and the viscosity index to 73.2.

The polymerization product obtained in the above described manner, may be further separated into more active and less active fractions by extracting it with a solution of benzol and 96% ethyl alcohol. The extraction of polymers with the benzol-alcohol solution may be carried out at elevated temperatures, for example, by boiling the mixture under a reflux condenser. Upon cooling the extraction mixture separates into two layers: the lower or benzol layer containing active polymers, and the upper or alcohol layer comprising the residual less active components of the polymerized oil. After separating the layers, e. g. by decantation, the active polymers may be recovered from the lower layer by distillation.

In some cases it may be advisable to refine the polymerization product in order to remove any dark constituents formed during the polymerization treatment. It should also be noted that the polymerization may be effected in the presence of mineral oil or some other suitable medium.

This method when applied to lubricating greases, likewise serves to improve their desired qualities and to increase their fluidity at low temperatures.

It is understood that in the appended claims the term fatty oil is used to comprise any oil of animal or vegetable origin.

I claim as my invention:

1. A lubricant comprising as its lubricating component a mixture of a viscous hydrocarbon oil and a small quantity of polymerized components which are active in raising the viscosity index of said lubricating oil, said active polymerized components being separated from a crude polymerized fatty oil produced by treating a polymerizable fatty oil with an inorganic halide polymerization catalyst, said crude polymerized fatty oil being a mixture of said polymerized active components and of components which are substantially inactive in raising the viscosity of the hydrocarbon oil when blended therewith in small proportions, said active polymerized component being that portion of the crude polymerized fatty oil which are, in the presence of said substantially inactive components, entirely soluble in benzol and only partially soluble in 50% aqueous alcohol at ordinary room temperatures.

2. A lubricant comprising as its lubricating component a mixture of a viscous hydrocarbon oil and a small quantity of polymerized components which are active in raising the viscosity index of said lubricating oil, said active polymerized components being separated from a crude polymerized fatty oil produced by treating a polymerizable fatty oil with an inorganic halide polymerization catalyst, said crude polymerized fatty oil being a mixture of said polymerized active components and of components which are substantially inactive in raising the viscosity of the hydrocarbon oil when blended therewith in small proportions, said active polymerized component being that portion of the crude polymerized fatty oil which are, in the presence of said substantially inactive components, entirely soluble in benzol and only partially soluble in 96% aqueous alcohol at ordinary room temperatures.

EGON EICHWALD.